Aug. 28, 1956     C. F. PHELPS     2,760,701
APPARATUS FOR FILLING TUBULAR CONTAINERS
Filed Jan. 31, 1952     4 Sheets-Sheet 3
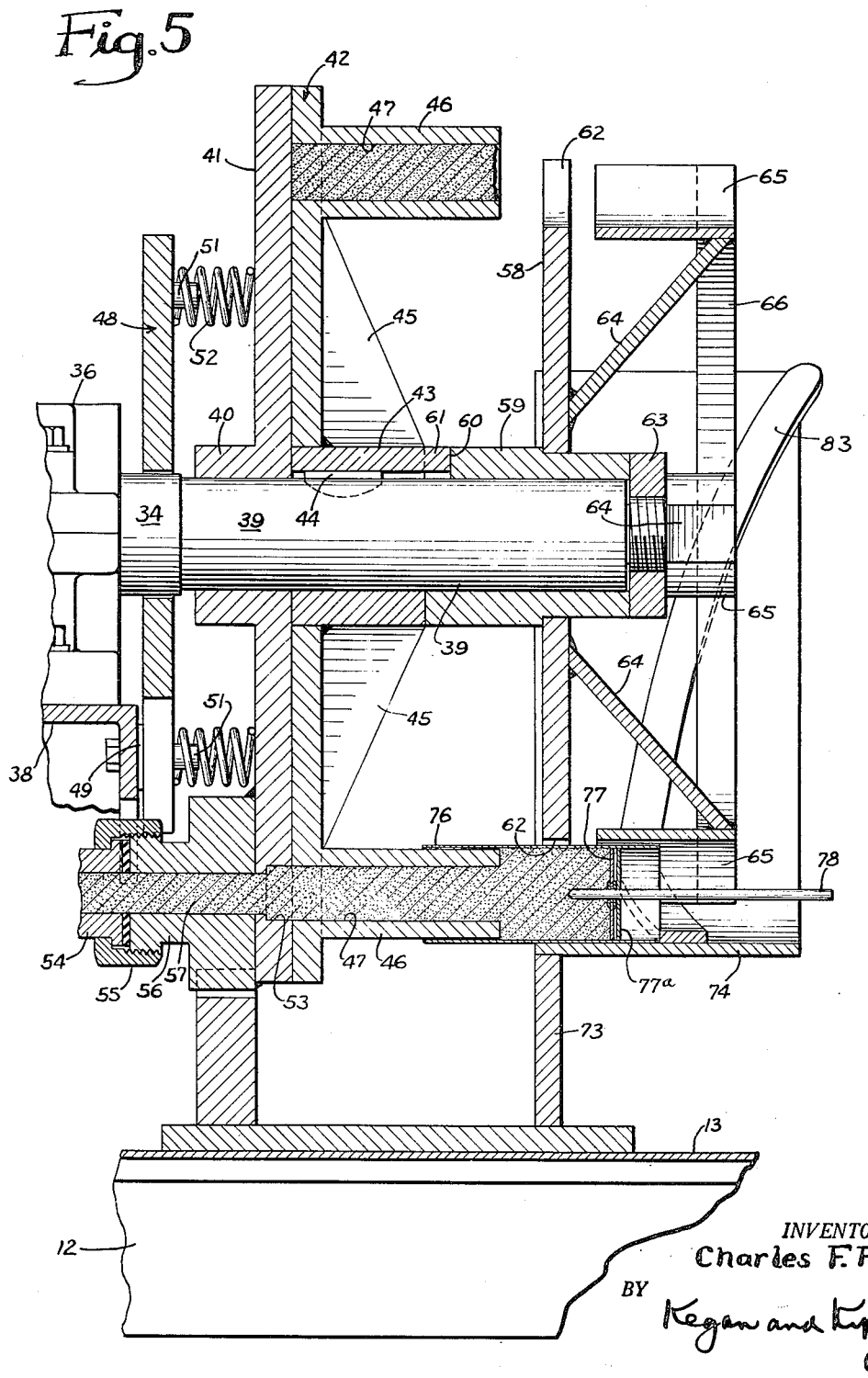
INVENTOR.
Charles F. Phelps
BY Kegan and Kegan
Attys.

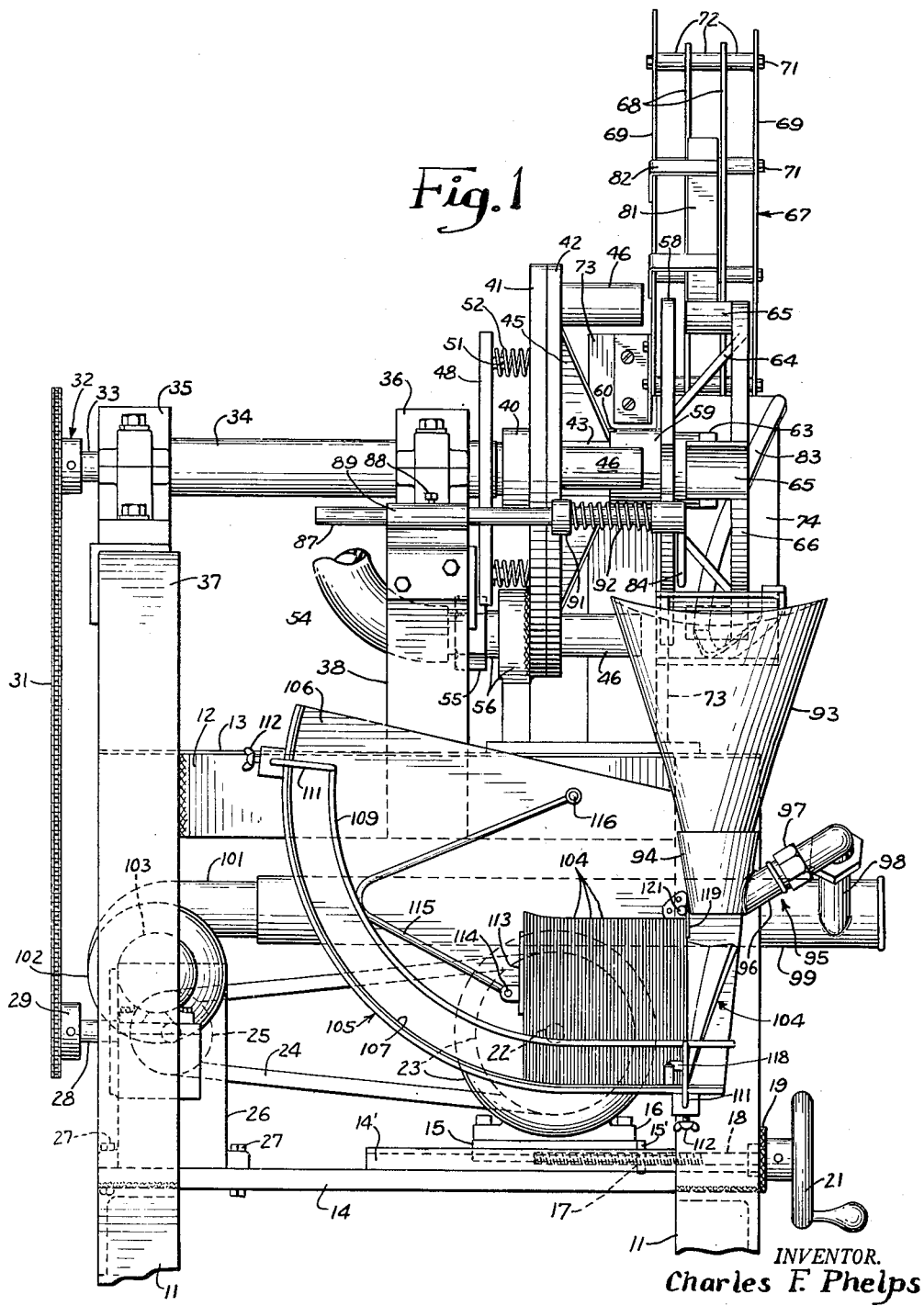

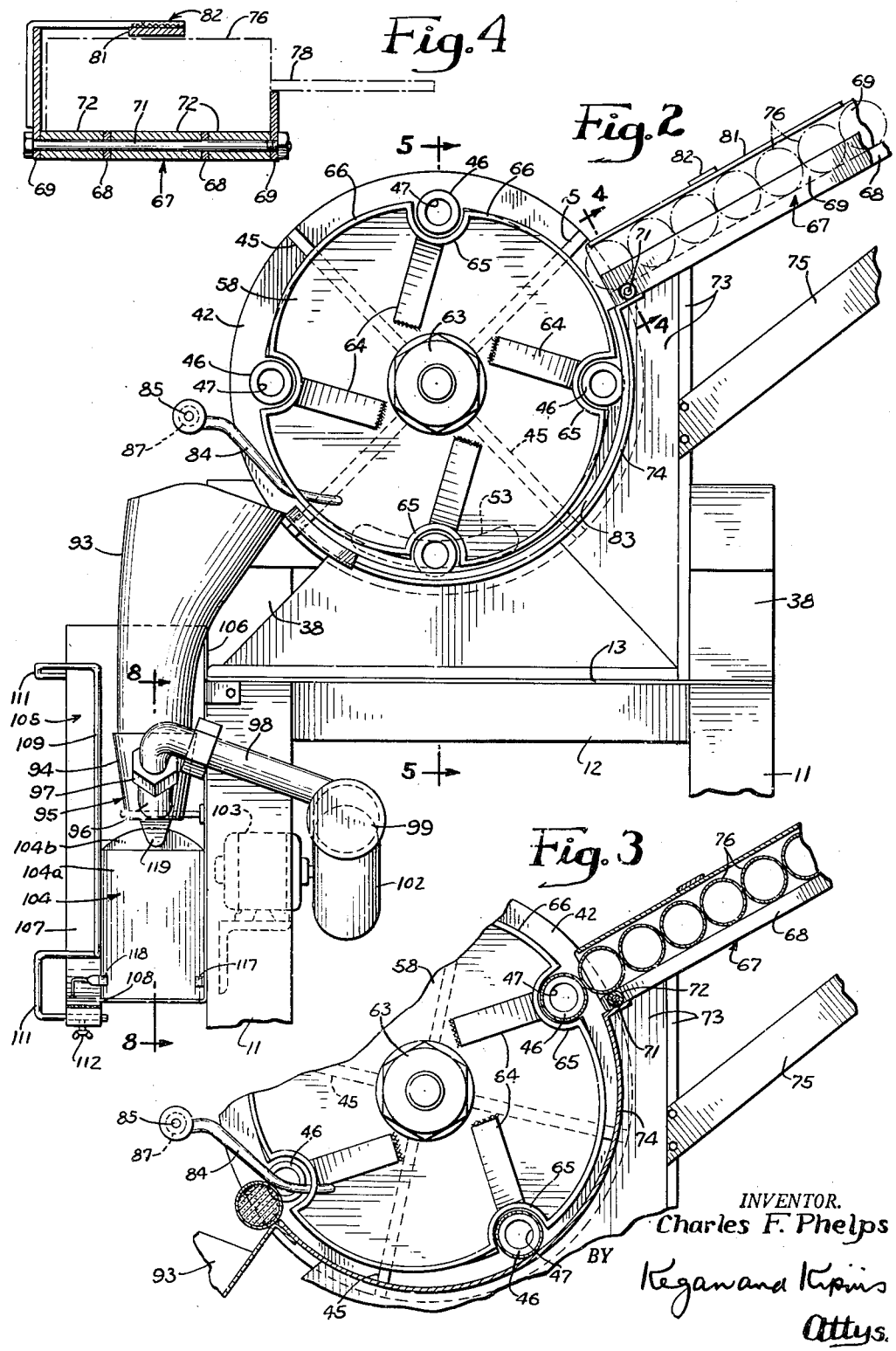

Aug. 28, 1956        C. F. PHELPS        2,760,701
APPARATUS FOR FILLING TUBULAR CONTAINERS
Filed Jan. 31, 1952        4 Sheets-Sheet 4
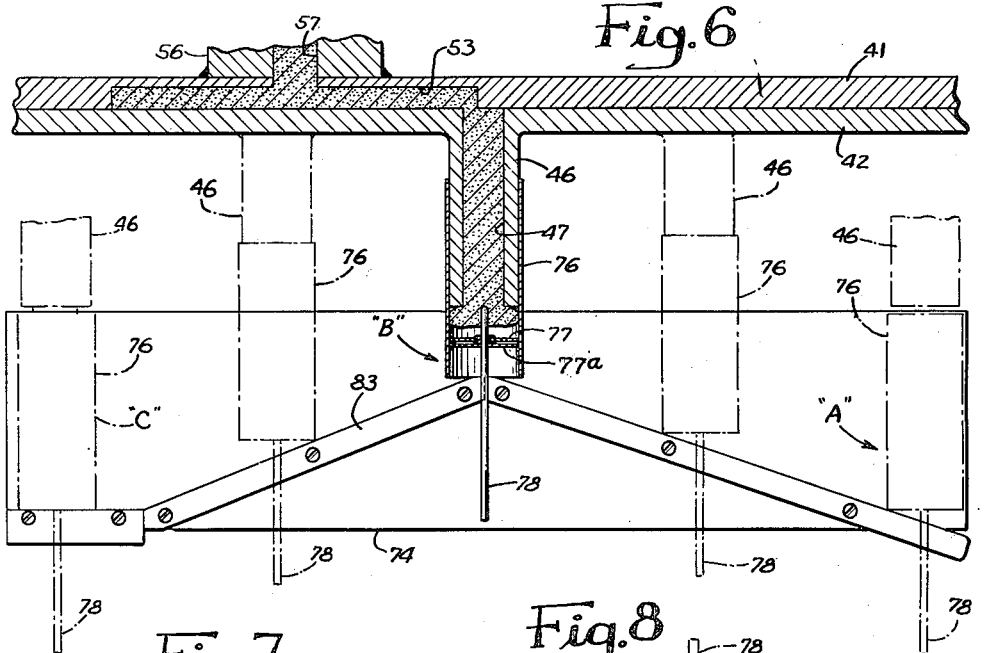
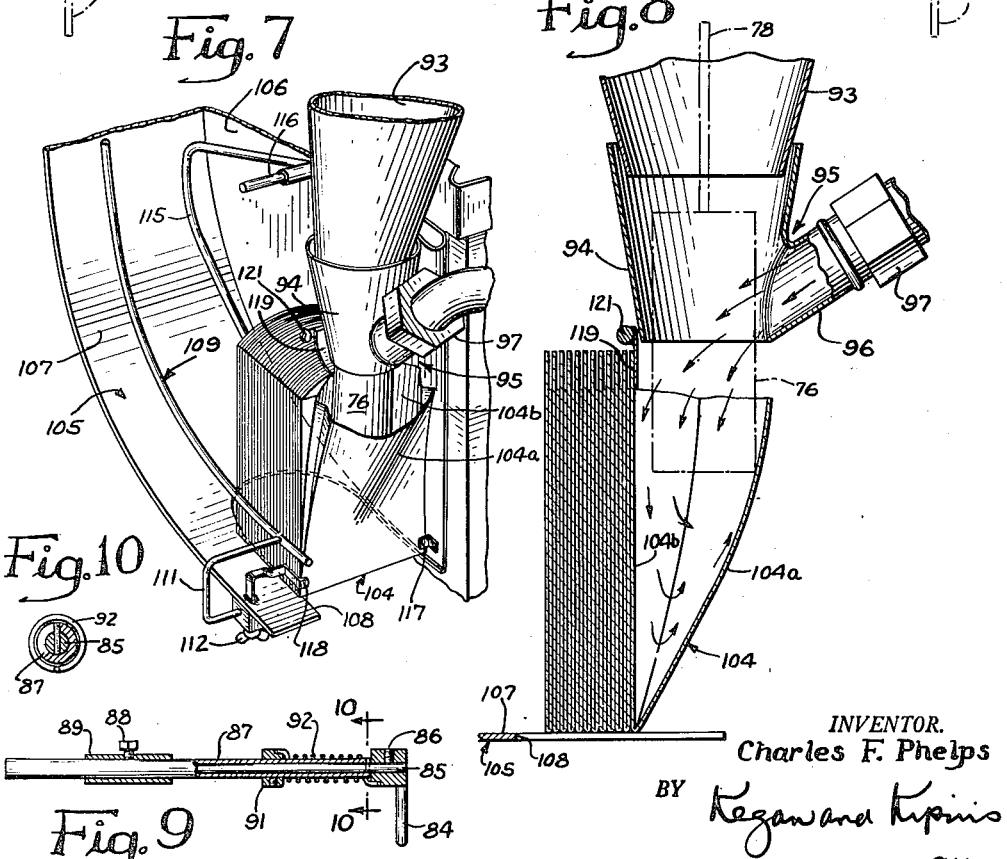
INVENTOR.
Charles F. Phelps
BY Kegan and Kipnis
Attys.

United States Patent Office 2,760,701
Patented Aug. 28, 1956

2,760,701

APPARATUS FOR FILLING TUBULAR CONTAINERS

Charles F. Phelps, Chicago, Ill., assignor to Paul K. Becker, doing business as Sumersett Products Company, Chicago, Ill.

Application January 31, 1952, Serial No. 269,229

12 Claims. (Cl. 226—24)

The invention relates to material handling apparatus and is particularly concerned with the novel structure of an apparatus designed to fill tubular containers with a semi-solid substance such as sherbet, ice cream and related products automatically and deposit such filled containers in merchandising wrappers, such as, for example, bags.

The specific product which the present apparatus is designed to produce consists of a cardboard cylinder open at one end and closed at the other end and having a disk slideable therein which, when the container is filled with sherbet or like substance, constitutes the bottom of the container. A stick of suitable length is anchored at one of its ends in the disk and is slidable through the closed end of the container so that as the container contents at the open end of the container is consumed, the disk may be advanced or pushed progressively through the cylindrical container until all or substantially all of the container contents is ejected. Frozen food products of this character are well known in the trade and no claim is made herein to such product.

Filling of the cardboard cylinders or containers has presented quite a problem in the industry and, to the best of applicant's knowledge, machines and apparatus presently in use are costly to operate and are characterized by inefficient operation resulting in slow output, and high labor costs. Such known prior machines and apparatus also have not been entirely satisfactory from the standpoint of sanitation. As is well known, machinery handling food products must be cleaned frequently and such cleaning must be hygienically thorough because otherwise stale or spoiled particles of food products as well, perhaps, as foreign material will remain and will be entrained in the flow of fresh substance when production is resumed. In addition to facilitating easy, quick and thorough cleaning of the parts, the machine should be easy to disassemble to facilitate cleaning and to reassemble.

The apparatus embodying the features of the present invention overcomes all of the prior objections in known prior machines and apparatus and it is particularly designed to insure rapid, accurate and complete filling of each cylinder or container fed therethrough and further to effect individual bagging automatically of filled containers upon their discharge from the filling apparatus.

It is therefore an object of the present invention to provide a novel, rugged and inexpensively constructed apparatus for automatically filling containers with sherbet and like semi-solid substances or materials.

Another object is to provide novel mechanism for delivering semi-solid material to a container positioned to receive such material.

Other objects are to provide novel means and mechanism to advance empty containers into positions to receive semi-solid material and to insure discharge of the filled containers at a predetermined station.

Still another object is to provide novel means for insuring the delivery of a filled container into a merchandise bag.

Another object is to provide novel means to open a merchandise bag in container receiving position.

Another object is to provide a novel mechanism for delivering, positioning and holding merchandise bags for the reception of products discharged from the apparatus, and for effecting the discharge of filled merchandise bags.

The foregoing and such other objects of the invention as will appear hereinafter as the description proceeds will be more readily understood upon reference to the accompanying drawings which illustrate a preferred embodiment of the invention and in which:

Fig. 1 is an end elevational view of an apparatus embodying the features of the invention, illustrating the legs broken away.

Fig. 2 is a front elevational view of the apparatus shown in Fig. 1, but showing portions thereof broken away.

Fig. 3 is a fragmentary front elevational view of the apparatus substantially as illustrated in Fig. 2, but showing the container chute, guide plate and containers in section.

Fig. 4 is an enlarged transverse fragmentary sectional view of the container delivery chute, taken substantially on line 4—4 of Fig. 2.

Fig. 5 is an enlarged sectional view of the filling and indexing mechanism taken along the line 5—5 in Fig. 2 and showing a partially filled container in position thereon.

Fig. 6 is a schematic and developed view of the guide plate cam track and material filling mechanism for controlling the advance and withdrawal of the containers on the filling nozzles and showing portions of the filling mechanism in section.

Fig. 7 is a fragmentary perspective view of the discharge end of the apparatus illustrating in particular the bag feeding, opening and discharge mechanism.

Fig. 8 is an enlarged sectional view of the discharge and bagging mechanism, taken substantially on line 8—8 of Fig. 2.

Fig. 9 is a side elevation, partly in section of the filled container discharge arm.

Fig. 10 is a section along the line 10—10 in Fig. 9.

Before entering into a detail discussion of the apparatus disclosed in the accompanying drawings, it may be stated that the apparatus is rugged and is compactly built so as to occupy a minimum amount of floor space. It is completely automatic in operation and includes associated means for conveying containers, of the kind described hereinbefore, to an indexing mechanism for presentation to the filling mechanism. Novel means is provided also to force separation of the containers, after they have been filled, from the index-filling mechanism and to cause them to be discharged individually into a merchandising bag held open by means of an air-blast directed thereinto.

Referring now to the specific disclosure, the apparatus is carried upon a frame structure including legs 11 and connecting bars or channels 12. A top plate 13 covers the frame structure and, located at a suitable distance below the top plate, there is provided a supporting base plate 14 mounting a rail 14' upon which is slidably mounted a bed-plate 15 carrying an electric motor 16. The motor mounting is perhaps best illustrated in Fig. 1 and upon reference thereto, it will be noted that the bed-plate 15 carries a depending bracket 15' which is tapped, as indicated at 17, to receive a screw threaded rod 18. The forward end of the rod 18 is journaled in a fixed bracket 19 and carries firmly thereon a hand wheel 21. Obviously, manual rotation of the hand wheel 21 in either direction will move the bed-plate 15 longitudinally along the rail 14 in a desired direction.

The motor shaft 22 carries a spring pulley 23 which connects by means of a V-belt 24 with a spring pulley 25 mounted on the projecting end of a shaft extending from a gear reduction box 26. Thus the spacing between the pulleys 23 and 25 and the speeds thereof may be varied without necessitating a change in the belt 24. The structure of the gear reduction box is of conventional design. It might be noted, however, that the reduction gear box 26 is shown secured firmly on the supporting base plate 14, as by bolts 27. A take-off shaft 28 extends rearwardly of the machine from the gear reduction box 26 and this shaft carries a sprocket 29 having a chain 31 trained over it. The chain 31 also is trained over a sprocket 32 secured firmly on the rearwardly projecting end 33 of a horizontally disposed main shaft 34.

The main shaft 34 is located above the top plate 13 and is journaled in split bearing blocks 35 and 36 carried firmly on the upper ends of vertical supports 37 and 38 respectively, constituting a part of the apparatus frame structure. The shaft 34 extends forwardly beyond the bearing block 36 and it is this shaft which mounts the indexing apparatus and filling mechanisms.

Referring to Fig. 5 it will be observed that the forwardly projecting end of the main shaft 34 has a reduced diameter 39 upon which is loosely mounted the hub 40 of a backing plate or disk 41 that is suitably held against rotation. The front face of the disk 41 is suitably machined so as to have a substantially leak proof bearing against the machined back face of a disk 42 which includes a hub 43 that is rotatably secured to the shaft portion 39 by means of a key 44. Suitable strengthening webs 45 may be formed on the disk 42, as shown, so as to impart the required rigidity thereto under the stress of machine operation. There preferably are four such webs. The disk 42 carries adjacent its periphery a plurality of laterally extending, cylindrical nozzles 46. The axial opening 47 through each nozzle 46 is extended through the disk 42 so as to afford a clear, uninterrupted passage-way from the back face of the disk 42 to the delivery end of the nozzle.

For reasons to become apparent hereinafter, it is essential that the backing plate 41 and disk 42 be maintained at all times in leak proof contact. This may best be effected by providing an abutment plate 48 on the frame structure which plate may be secured thereto in any suitable manner such as, for example, by being bolted or otherwise attached, as at 49, to the standard 38 supporting the bearing block 36. Upon referring to Figs. 1 and 5 it will be noted that the abutment plate 48 has, on its forwardly disposed face, a plurality of spaced studs 51 over each of which is fitted a compressed helical spring 52. These springs 52 maintain the backing plate 41 under sufficient pressure so as to urge it at all times into leak proof contact with the disk 42.

The nozzles 46 on the disk 42 deliver semi-solid food substances or other products to containers associated therewith in a manner and by means of apparatus to be described presently. At this time, however, it appears advisable to describe the manner in which the semi-solid substance or other product is delivered to the nozzles 46. Referring now to Figs. 5 and 6 it will be observed that the backing plate 41 is provided on its abutment face with an elongated recess 53, preferably arcuately shaped as indicated in dotted lines in Fig. 2, having in communication therewith a substance supply line 54. For this purpose, the line 54 is connected, as by means of flanged nut 55, to a fitting 56 firmly secured, as by welding, to the back face of the backing plate 41 in registration with the arcuate recess 53. A passage 57 in the fitting 56 and in the backing plate 41 provides the means for admitting the semi-solid substance from the supply line 54 into the arcuate shaped recess 53. The substance delivered through the supply line 54 is maintained under pressure at all times by means common in the industry, consequently, no description of such pressure means is made in the present application.

Also mounted upon and rotatable with the horizontal main shaft 34 is a second disk 58 including a hub 59 having a notch on its rear edge, as at 60, to receive a lug 61 provided on the opposed end face of the hub 43 of disk 42. The notch-lug arrangement 60—61 affords means whereby the disk 58 is accurately positioned circumferentially with respect to the disk 42. This positioning is essential in order to accomplish the filling of containers in a manner to be described presently. The disk 58 is provided with four equispaced and semi-cylindrical recesses 62 (see Fig. 5) which extend radially inward from the periphery of the disk, each recess being axially aligned with a corresponding cylindrical nozzle 46. The disk 58 is held in place on the shaft portion 39 by means of a nut 63 threaded on the externally threaded reduced diameter of said shaft portion and it should be quite evident that both the disk 58 and the disk 42 may be readily and quickly removed from the shaft portion 39 and repositioned thereon easily when such removal or repositioning is required, as for example, while cleaning the apparatus.

The disk 58 has on its front face a plurality (in this instance four) of forwardly and outwardly extending arms 64, integral therewith, each carrying on its outer end a semi-cylindrical pocket 65 which is axially aligned with a corresponding recess 62 and nozzle 46. Each pocket 65 extends rearwardly from the outer end of its supporting arm 64 and terminates short of the disk 58. A connecting band 66, having a contour corresponding to the circular outline of the disk 58 is joined to the free edges of the pockets 65, as best illustrated in Fig. 2, for a purpose to be described presently. It may be observed, upon reference to Fig. 2 and considering clockwise rotation, that the trailing edge of each pocket 65 is located radially outward of the leading edge.

During machine operation, the pockets 65, and axially aligned recesses 62, constituting the carrying elements of the indexing mechanism, are adapted to receive a container to be filled with the substance delivered into and through the nozzles 46. These containers preferably are cylindrical in shape and are of such diameter as to rest snugly in the respective pockets 65 and recesses 62. It will become apparent as the description proceeds that these containers are delivered successively to the pockets 65 while the disk 58 is rotating clockwise and that when a container carried thereon arrives at a predetermined position during its travel with the disk 58, said container is forcibly thrust or telescoped over a related axially aligned nozzle 46 whereupon the semi-solid substance is delivered into the container and, when the said container has been filled completely, it is engaged by means automatically effective to separate the filled container from the disk 58 and discharge it from the pocket 65 in which it has been carried.

In order to accomplish successive feeding of containers into the pockets 65 of disk 58, while the latter is being rotated, suitable means in the form of a chute, generally indicated at 67, may be mounted on the apparatus. The chute mounting is perhaps best illustrated in Figs. 2, 3 and 4 and, upon referring to these figures, it will be apparent that it includes a plurality of parallel intermediate bars or straps 68 and side straps 69 suitably tied together by transverse bolts 71 having spacers 72 thereon to maintain the straps 68 and 69 in spaced relationship.

The chute assembly just described is mounted firmly on the apparatus frame structure by means of an auxiliary frame 73 which includes a semi-cylindrically shaped plate 74 which extends from and may be secured to the lower discharge end of the chute assembly 67, around the bottom portion of the disk 58 and terminates substantially at a point diametrically opposed to its point of beginning. As desired, a reinforcing strap 75 may be secured at one of its ends to the auxiliary frame structure 74 and at its other end (not shown) to the remote upper end of the chute 67.

The chute 67 is of sufficient width to receive, in horizontal position, a supply of the containers 76, each of which consists of a cardboard tube that is open at one end and closed adjacent the opposite end by a disk 77ª that is press fitted in position. A stick 78 is slidable through the disk 77ª and firmly carries a plunger disk 77 which, when moved, expels the filling in the container out of the open end thereof. One of the chute side straps 69 is of a height to permit the sticks 78 to extend thereover, as shown in Fig. 4, while the other side strap 69 is of a height corresponding substantially to the diameter of the cylindrical container 76. In order to prevent inadvertent displacement of the cylindrical containers 76 in the chute 67, a restraining strap 81 is arranged thereover and is held in place by a bracket 82 having one of its legs firmly secured to one of the said straps 69 in any approved manner. Obviously the containers 76 may be delivered to the chute by any means or mechanism deemed advisable and that the said containers will roll down said chute so that, when the apparatus is in the position illustrated in Fig. 2, the lower-most one will rest against the band 66.

Rotation of the disk 58 clock-wise will carry succeeding pockets 65 into positions beneath the chute 67 whereupon the lower-most container in the chute will drop into a registering pocket and each is carried therealong from the said loading station to what might be termed a filling station. Displacement of the containers from the pockets 65 while they are being carried downwardly around the bottom arc of the disk 58 is prevented by the plate 74. From the foregoing, it will be understood that the disks 42 and 58 constitute a rotary carrier, with the disks respectively including filling and supporting mechanisms for the containers.

The plate 74 carries means to progressively telescope a container carried in one of the pockets 65 at the container receiving or loading station (A in Fig. 6) so that when said pocket reaches a position best illustrated at B in Fig. 6, the tubular container is fully telescoped over its related nozzle 46 moving therewith. When in this position, the nozzle 46 communicates with the arcuate slot 53 so that the semi-solid substance delivered thereinto is forcibly projected into the interior of the nozzle 46 and into the tubular container 76 telescoped thereover. Still referring to Fig. 6, a cam track 83 mounted on the inside face of the arcuate plate 74 is contoured to initially telescope the container over the nozzle 46 and to thereafter permit gradual outward movement of the telescoped container as it is filled under pressure during continued rotation of the disk 58. Upon reaching the extremity (left-hand end illustrated Fig. 6) of the slot 53, the supply of semi-solid substance to the nozzle 46 is cut off and at this time the tubular container 76 is completely filled therewith. Further, the container 76 is then clear of the related nozzle 46, but the substance in the container still connects with the substance in the nozzle as shown in the "C" position in Fig. 6.

Just prior to reaching the position illustrated in broken lines at C in Fig. 6, the filled container 76 engages the free end of a kick arm 84 (Fig. 2) firmly mounted upon one end of rock shaft 85. This shaft 85 and its mounting is best illustrated in Figs. 9 and 10. Upon referring to those figures it will be observed that the kick arm 84 is firmly secured on the forward end of the shaft 85, preferably by means of a set screw 86 carried in the hub of said kick arm, and is positioned to engage the end of the container which is remote from the stick end as shown in Fig. 1. The shaft 85 extends rearwardly of the kick arm and is telescoped into a tube 87 firmly secured, as by lock screw 88, in a strap bearing 89 supported on the forward-most split bearing standard 38. The tube 87 carries a collar 91 firmly secured thereon and said collar is suitably notched to receive in interlocking engagement therewith one end of a coil spring 92. The spring 92 is arranged around the shaft 85 between the collar 91 and the kick arm hub. The other end of the spring, that which bears against the kick arm hub, is engaged in a notch or recess therein so that said kick arm 84 normally is held under spring tension in the position illustrated in Fig. 2. Adjustment of its normal position may, of course, be varied by altering the relative position of the collar 91 on tube 87.

When the filled tubular container reaches the position approximating that illustrated at C of Fig. 6 mentioned hereinabove it engages the free end of the kick arm 84 so that continued circular movement of the filled container causes said arm to be rocked on its axis 85 whereupon the spring 92 is tensioned. When the spring 92 becomes sufficiently tensioned (predetermined) the kick arm 84 acts to forcibly eject the engaged filled container from its pocket 65 when the container reaches the lower end of the plate 74 as shown in Fig. 3. This forcible ejection of a filled container is necessary because of the inherent tendency of the semi-solid substance in the container to adhere to the semi-solid substance contained within the nozzle 46. In other words the filled container is sheared from its supply source.

When a filled container is ejected from the indexing disk 58 by action of the kick arm 84 its innermost or open end is forced downwardly so that it enters a discharge chute 93 with its stick 79 extending upwardly. It drops by gravity from the discharge chute 93 into a funnel-like portion 94 which communicates with an air jet nozzle generally indicated at 95. The nozzle 95, which is best illustrated in Figs. 1 and 8, has an angularly projecting tubular portion 96 opening into the interior of the funnel-like portion 94. The tubular portion 96 may be threaded to receive a coupling 97 connecting a conduit 98 therewith. The conduit 98 constitutes an extension of an air chamber 99 (Fig. 1) which preferably is tubular and extends horizontally from substantially the front portion of the apparatus to the rear portion thereof. The rear portion is connected, by means of a discharge outlet 101, with an air blower 102 driven by an electric motor 103.

When the motor 103 is in operation the blower 102 operates to create a continuous stream of air which flows through the tubular portion 96 of the air jet nozzle 95. This air stream is directed towards and below the rear edge of the funnel-like portion 94, as indicated by the arrows on Fig. 8. The air stream is intended solely to open merchandise wrappers 104, each of which is formed as a bag having a front wall 104a that terminates below the top edge of the back wall 104b for a purpose to be described presently.

Still referring to Figs. 7 and 8, the bags 104 are contained in a guide frame, generally indicated at 105, which in this instance consists of a supporting wall plate 106 having an arcuately shaped floor plate 107 extending perpendicular thereto. The floor plate 107 has its forward ends cut out, as at 108, so that when bags carried on the floor plate 107 reach the forward-most end thereof they may be discharged in a manner to be described. The guide frame 105 is designed to accommodate bags of various widths and to this end a guide rail 109 which defines the outer limits of the bag size to be accommodated therein is carried on U-shaped brackets 111 adjustably secured by means of wing nuts 112 to blocks carried on the bottom side of the floor plate 107.

The bags 104 are maintained normally in a substantially vertical position and are adapted to be successively advanced toward the discharge end of the floor plate 107. For this purpose a backing plate 113 is arranged to bear against the rear-most bag in the stack. This plate 113 is pivotally secured to the free end 114 of an arm 115 pivotally mounted at 116 to the supporting wall 106. It should be quite evident that the arm 115 and plate 113 normally tend to maintain sufficient pressure on the stack of bags in the guide frame 105 so as to at all times urge the bags forwardly along the curved bottom plate 107. The forward-most bag normally is held against dropping off the forward end of the floor plate 107 by means of clips 117 and 118. One of the clips 117 is secured to the wall 106, whereas the other clip is mounted on the bottom plate 107 and is of sufficient length and flexibility as to be capable of being adjusted toward or away from the position illustrated. In either event, the clips 117 and 118 will prevent displacement normally of the forward-most bag in the stack.

Additional means to prevent displacement of the forwardmost bag 104 in the stack is in the form of a plate 119 (Fig. 8) firmly mounted on a freely rotatable rod 121. The plate 119 rests against the projecting portion of the rear wall 104b of the forwardmost bag 104. Because of this means of holding the forwardmost bag in place, said bag is urged into substantially the open position illustrated in Fig. 8 by reason of the air stream flowing thereinto. This opens the bag sufficiently to admit the descending container 76, illustrated in said figure in broken lines, and when the filled container is enclosed in the bag 104, normal bowing or puckering of the lowermost portion of the bag causes its edges to be pulled out of engagement behind the clips 117 and 118. This reduction in the over-all width of the now filled bag permits it to drop through the discharge cut-out 108 in the floor plate 107 onto any conveyor, receptacle or other means which may be provided to receive the bagged product.

Although an exemplary embodiment of an apparatus has been disclosed in detail in the accompanying drawings and described in the accompanying specifications, it is to be understood that the invention may embody a wide variety of modifications in structure and assembly without departing from the spirit of the invention or the scope of the appended claims.

I claim:

1. In a machine for supplying a semisolid material to a succession of containers each closed at one end, the combination of means at a filling station to feed the material under pressure, a first movable member having a plurality of nozzles which successively register with the filling station, a second member movable at the same speed as the first member and including a plurality of container receiving pockets each of which is coaxial with a companion nozzle, means at a loading station for depositing a container into successive pockets as the second member passes thereby, means for telescoping each deposited container over its companion nozzle when out of registration with the filling station to place the latter's delivery end adjacent the closed end of the container, and means operable during registration of a nozzle with the filling station to provide a yielding restraint on the associated container as it is retracted from the nozzle by the pressure of the supplied material.

2. In a machine for supplying a semisolid material to a succession of containers each closed at one end, the combination of means at a filling station to feed the material under pressure, a first rotary member having a plurality of laterally extending nozzles which successively register with the filling station, a second member rotatable in unison with the first member and including a plurality of container receiving pockets each of which is coaxial with a companion nozzle, means for depositing a container into successive pockets as the second member rotates, means for telescoping each deposited container over its companion nozzle when out of registration with the filling station to place the latter's delivery end adjacent the closed end of the container, and means operable during registration of a nozzle with the filling station to provide a yielding restraint on the associated container as it is retracted from the nozzle by the pressure of the supplied material.

3. In a machine for supplying a semisolid material to a succession of containers each closed at one end, the combination of means at a filling station to feed the material under pressure, a first rotary member having a plurality of laterally extending nozzles which successively register with the filling station, a second member rotatable in unison with the first member and including a plurality of container receiving pockets each of which is coaxial with a companion nozzle, means for depositing a container into successive pockets as the second member rotates, means for telescoping each deposited container over its companion nozzle when out of registration with the filling station to place the latter's delivery end adjacent the closed end of the container, means operable during registration of a nozzle with the filling station to provide a yielding restraint on the associated container as it is retracted from the nozzle by the pressure of the supplied material, and means for discharging each filled container from its pocket.

4. In a machine for supplying a semisolid material to a succession of containers each closed at one end, the combination of means at a filling station to feed the material under pressure, a first rotary member having a plurality of laterally extending nozzles which successively register with the filling station, a second member rotatable in unison with the first member and including a plurality of container receiving pockets each of which is coaxial with a companion nozzle, means for depositing a container into successive pockets as the second member rotates, means for telescoping each deposited container over its companion nozzle to place the latter's delivery end adjacent the closed end of the container, means operable during registration of a nozzle with the filling station to provide a yielding restraint on the associated container as it is retracted from the nozzle by the pressure of the supplied material, and a spring tensioned finger engageable by each filled container for discharging the same from its pocket.

5. In a machine for supplying a semisolid material to a succession of containers each closed at one end, the combination of means at a filling station to feed the material under pressure, a rotary carrier having a plurality of nozzles which successively register with the filling station and a plurality of container receiving pockets each of which is coaxial with a companion nozzle, means for depositing a container into successive pockets as the carrier rotates, cam means including first and second portions successively engageable with the closed ends of the containers as the carrier rotates, the first cam portion advancing each deposited container into telescopic relation around its companion nozzle until the delivery end thereof lies adjacent the closed end of the container and the second cam portion being operable during registration of a nozzle with the filling station to provide a yielding restraint on the associated container as it is retracted from the nozzle by the pressure of the supplied material.

6. In a machine for supplying a semisolid material to a succession of containers each closed at one end, the combination of means at a loading station, means at a discharge station, a carrier movable from the loading to the discharge station and including a plurality of spaced pockets for successively receiving containers deposited at the loading station, means at a filling station to feed the material under pressure located between the loading and discharge stations, a plurality of nozzles mounted on the carrier for successive registration with the filling station and arranged to cooperably relate each nozzle to a companion pocket, cam means including first and second portions successively engageable with the closed ends of the containers as the carrier moves, the first cam portion telescoping each deposited container over its companion nozzle to place the latter's delivery end adjacent the closed end of the container and the second cam portion being operable during registration of a nozzle with the filling station to provide a yielding restraint on the associated container as it is retracted from the nozzle by the pressure of the supplied material, and means for separating each filled container from its pocket at the discharge station.

7. In a machine for supplying a semisolid material to a succession of containers each closed at one end, the combination of a rotary carrier including spaced first and second, parallel disks, a plurality of circumferentially spaced nozzles extending laterally from one side of the first disk, a non-rotatable back plate held in leak tight contact with the opposite side of the first disk and including an arcuate recess in the abutting face thereof adapted for connection with a source of the material under pressure, the radii of the recess and nozzles being equal whereby the nozzles successively register with the recess for filling, a plurality of circumferentially spaced pockets mounted on the second disk each of which is coaxial with a companion nozzle, means for depositing a container into successive pockets as the carrier rotates, means for telescoping each deposited container over its companion nozzle to place the latter's delivery end adjacent the closed end of the container, and means operable during registration of a nozzle with the recess to provide a yielding restraint on the associated container as it is retracted from the nozzle by the pressure of the supplied material.

8. In a machine for supplying a semisolid material to a succession of containers each closed at one end, the combination of a rotary carrier including spaced first and second, vertical and parallel disks, a plurality of circumferentially spaced nozzles extending laterally from one side of the first disk, a non-rotatable back plate held in leak tight contact with the opposite side of the first disk and including an arcuate recess in the lower part of the abutting face thereof adapted for connection with a source of the material under pressure, the radii of the recess and nozzles being equal whereby the nozzles successively register with the recess for filling, a plurality of circumferentially spaced pockets mounted on the second disk, each pocket opening radially outward and being coaxial with a companion nozzle, means for depositing a container into successive pockets as the carrier rotates, a curved guide plate positioned beneath the second disk and extending from the deposit means to terminate in a horizontal edge beyond the recess in the direction of carrier rotation, the plate retaining the containers in their pockets on the lower side of the carrier, means for telescoping each deposited container over its companion nozzle to place the latter's delivery end adjacent the closed end of the container, means operable during registration of a nozzle with the recess to provide a yielding restraint on the associated container as it is retracted from the nozzle by the pressure of the supplied material, and a spring tensioned finger engageable with the open end of the container as it approaches the plate edge whereby the engaged container is ejected from the associated pocket and rocked on the edge to drop substantially vertically with the open end of the container downwardly disposed.

9. In a machine for supplying a semisolid material to a container closed at one end, the combination of passage means to which the material is supplied under pressure, a plurality of nozzles successively registrable with the passage means, means for telescoping a container over each nozzle when out of registration with the passage means to place the closed end of the container adjacent the delivery end of the associated nozzle, and means providing a yielding restraint on the telescoped container as it is retracted from the nozzle by the pressure of the supplied material.

10. In a machine for supplying a semisolid material to a rigid container closed at one end, the combination of a filling nozzle, means for telescoping the container over the nozzle to place the latter's delivery end adjacent the closed end of the container, means for establishing a pressure flow of the material through the nozzle only when the container is in telescoped position, and means for determining the retracting movement of the container off the nozzle including the cooperative action of the material pressure and cam restraining means reacting against the closed end of the container and conditioned to accommodate the retracting pressure movement of the container.

11. In a machine for supplying a semisolid material to a rigid container closed at one end, the combination of a filling nozzle, means for telescoping the container over the nozzle to place the latter's delivery end adjacent the closed end of the container, means for establishing a pressure flow of the material through the nozzle only when the container is in telescoped position, means for determining the retracting movement of the container off the nozzle including the cooperative action of the material pressure and cam restraining means reacting against the closed end of the container and conditioned to accommodate the retracting pressure movement of the container, and means for severing the material in the container from the material in the nozzle when the container is free of the nozzle.

12. In a machine for supplying a semisolid material to a rigid container closed at one end, the combination of a filling nozzle, means for positioning a container in coaxial relation to the nozzle, means for relatively moving the nozzle and container to telescope the container over the nozzle and place the latter's delivery end adjacent the closed end of the container, means for establishing a pressure flow of the material through the nozzle only when the container is in telescoped position, and means for determining the retracting movement of the container off the nozzle including the cooperative action of the material pressure and cam restraining means reacting against the closed end of the container and conditioned to accommodate the retracting pressure movement of the container.

References Cited in the file of this patent

UNITED STATES PATENTS

| | | |
|---|---|---|
| 2,062,277 | Routh | Nov. 24, 1936 |
| 2,136,224 | Weinreich | Nov. 8, 1938 |
| 2,415,109 | Nordquist | Feb. 4, 1947 |
| 2,506,819 | Sydow | May 9, 1950 |
| 2,553,250 | Gross | May 15, 1951 |
| 2,648,476 | Kennedy | Aug. 11, 1953 |